United States Patent
Fray et al.

[11] 4,066,334
[45] Jan. 3, 1978

[54] LIQUID CRYSTAL LIGHT DEFLECTOR

[75] Inventors: Adrian Forrest Fray, Malvern Link; David Jones, Malvern, both of England

[73] Assignee: National Research Development Corporation, London, England

[21] Appl. No.: 646,834

[22] Filed: Jan. 5, 1976

[30] Foreign Application Priority Data

Jan. 6, 1975 United Kingdom .................. 496/75
June 26, 1975 United Kingdom ............ 27180/75

[51] Int. Cl.² .............................................. G02F 1/13
[52] U.S. Cl. .............................................. 350/160 LC
[58] Field of Search ......................... 350/160 LC, 150

[56] References Cited

U.S. PATENT DOCUMENTS 3,424,513   1/1969   Lotspeich ..................... 350/175 GN

OTHER PUBLICATIONS

Freiser: "Light Scanner Employing a Nematic Liquid Crystal", *IBM Tech. Disclosure Bull.*, vol. 15, pp. 2540–2541, Jan. 1973.
Holzman: "Liquid Crystal Light Modulator and Scanner", *IBM Tech. Disc. Bull.*, vol. 8, pp. 151–152, June 1965.
Hu et al.: "Optical Deflection in Thin-Film Nematic-- Liquid-Crystal Waveguides", *IEEE Jour. of Quart. Elect.*, vol. QE-10, Feb. 1974.
Sheridan et al.: "Electro-optically Induced Deflection in Liquid Crystal Waveguides", *Jour. of Applied Physics*, vol. 45, pp. 5160–5163, Dec. 1974.

*Primary Examiner*—Edward S. Bauer
*Attorney, Agent, or Firm*—Cushman, Darby & Cushman

[57] ABSTRACT

An optical modulation device such as an electrical switchable prism, which may be used as a light deflector, or an electrically switchable lens, comprises a volume of liquid crystal material, means for applying electric or magnetic bias fields across the material and means for switching the bias fields to provide a controlled refractive index gradient in the liquid crystal material. The liquid crystal material may be contained between substrates having a set of four or eight electrodes (collectively) on their inner surfaces.

6 Claims, 13 Drawing Figures

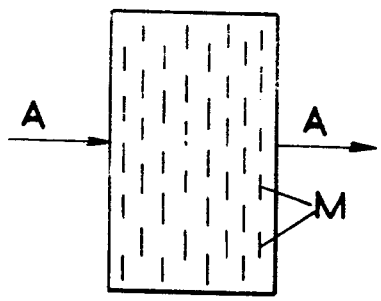
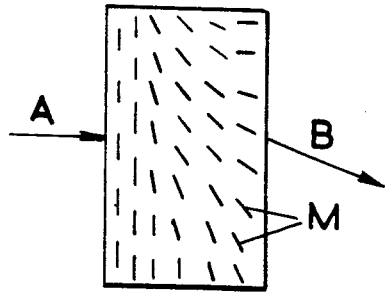
VERTICAL SECTIONS THROUGH ZONE 70
FIG. 10.  FIG. 11.
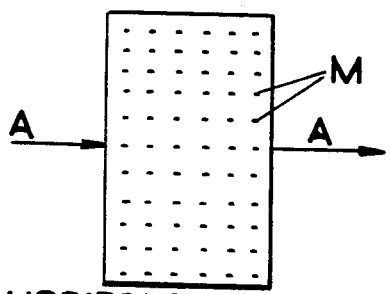
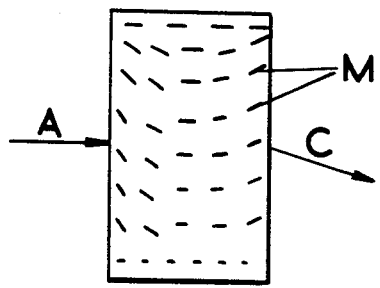
HORIZONTAL SECTIONS THROUGH ZONE 70
FIG. 12.  FIG. 13.

LIQUID CRYSTAL LIGHT DEFLECTOR

The present invention relates to optical modulation devices, particularly optical radiation deflectors and lenses.

With the rapid growth of optoelectronics, e.g. laser and infra-red technologies, in recent years electrically controlled devices which modulate optical radiation have found use in some of the systems which have been developed. For example, in optical computer stores using a laser beam deflectors are required to deflect the beam to address the store. Conventionally, modulation devices such as deflectors have been solid state, e.g. Pockels effect devices made from lithium niobate.

Unfortunately, solid state deflectors operate at very high voltages, typically a few kilovolts, and produce very small angular deflections, typically 1°. Furthermore deflection is in one plane only.

According to the present invention an optical modulation device includes a cell containing a volume of nematic liquid crystal material, means for applying a combination of bias fields across the cell to produce a first condition in which the molecules of the liquid crystal material in the interior of the cell are aligned by the bias fields in a generally uniform direction and to produce separately a second condition in which the molecules of the liquid crystal material in the interior of the cell are orientated to provide across the interior a controlled refractive index gradient capable of refracting optical radiation having a plane of polarisation in a plane of the gradient, the amount of the refraction being controlled by the bias fields, and means for changing the bias fields between the first and second conditions. 'Optical radiation' is intended to include infra-red and ultraviolet radiation as well as visible light.

The bias fields are preferably electric although they may alternatively be magnetic.

In the case in which the bias fields are electric the cell may comprise a layer of nematic liquid crystal material, typically a few millimeters thick, sandwiched between transparent insulating (e.g. glass) substrates having electrodes deposited on their inner surfaces in a known way.

For instance one substrate may have two separated electrodes whilst the other has two more separated electrodes facing the first two. If voltages of a few hundred volts are applied between the respective pairs of facing electrodes such as to provide two electric fields of the same sense across the layer the liquid crystal molecules are orientated to lie in one general direction. However if the polarity of one of the electrodes is reversed by a conventional switch the molecules in the liquid crystal layer form three different orientation zones.

In the first zone with is sandwiched between one pair of facing electrodes the molecules all lie in a first general direction. In the second zone which is sandwiched between the other pair of facing electrodes the molecules all lie in a second general direction perpendicular to those in the first zone. In the third zone, which is between the other two zones, the general orientation of the molecules gradually changes from the first direction to the second direction. Thus, the refractive index of the layer in the third zone has a gradient which may be controlled by the magnitude of the applied voltages, and which can therefore refract light having a plane of polarisation in a plane of the gradient. Thus the third zone acts as an electrically switched and controlled refracting prism or deflector.

A deflector so provided can be used for deflecting a laser beam; as such it provides a relatively large angular deflection, typically 10°, by relatively low voltages, typically a few hundred volts.

Furthermore, by providing a set of eight electrodes on the glass substrates deflection in either or both of two planes is possible as described below.

Refractive index gradients in liquid crystal devices are known in the prior art. However, such gradients all occur at the edges of the device electrodes when biased, and as such are localised and abrupt. Liquid crystal molecules have large thermal fluctuations in orientation, and the effect of these fluctuations is most marked in localised regions. Consequently, the molecules in the localised refractive index gradients associated with electrode edges appear to be randomly orientated and are highly scattering to light, and the gradient is generally uncontrollable by the electric fields applied by the electrodes. In contrast, the refractive index gradient provided by using the present invention may be relatively gradual and non-localised and the effect of the molecular thermal fluctuations on the gradient may be insignificant because of the averaging effect of the non-localised nature of the gradient.

Embodiments of the invention will now be described by way of example with reference to the accompanying drawings, in which:

FIGS. 10 to 13 are sketches of liquid crystal molecular arrangements within sections of a zone of the liquid crystal layer shown in FIG. 9.

Figure 1:
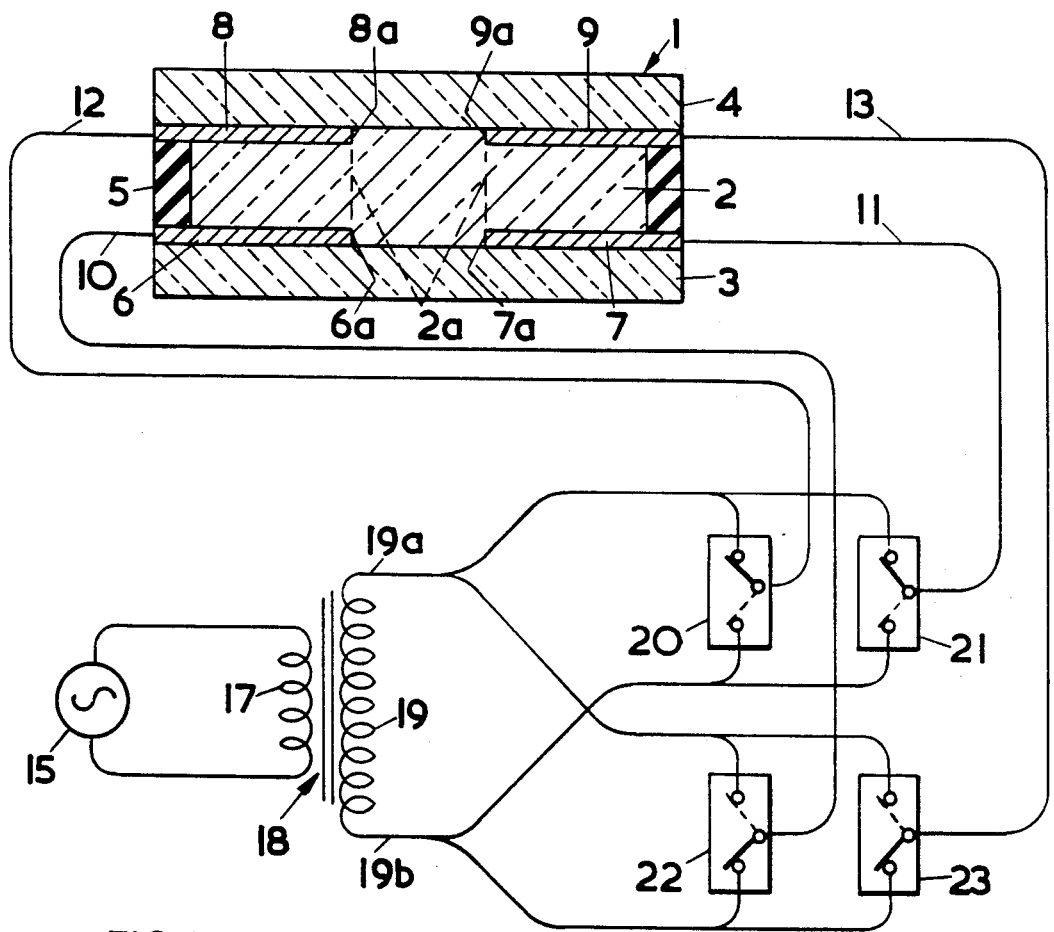
FIG. 1 is a diagram of an electric field operated liquid crystal modulation device comprising a cell, shown as a cross-sectional view, and an arrangement for applying voltages to the cell, shown in circuit form.

As shown in FIG. 1 a liquid crystal cell 1 includes a layer 2 of a nematic liquid crystal material which has a positive dielectric anisotropy (ie difference between its dielectric constant measured along its molecules and that measured across its molecules).

Suitable material includes a cyanobiphenyl, e.g. N 4′-pentyl-4-cyanobiphenyl, or a mixture of N 4′ alkyl or alkoxy-4-cyanobiphenyls and a terphenyl e.g. 4″-pentyl-4-cyano-p-terphenyl. The material E8 manufactured by BDH Chemicals Ltd., is an example of such a mixture. The layer 1 is enclosed between glass plates 3 and 4 and a spacer 5, such as a ring of plastics material, located between the plates 3 and 4. The plate 3 has on its inner surface two electrodes 6 and 7 consisting of thin rectangular layers (whose layer thickness only is shown in FIG. 1) having respective edges 6a and 7a which are spaced apart and parallel to one another. Similarly, the plate 4 has on its inner surface two electrodes 8 and 9 consisting of thin layers (whose layer thickness only is shown in FIG. 1) having respective edges 8a and 9a which are spaced apart and parellel to one another. The electrodes 6, 7, 8 and 9 are formed in a conventional way eg by evaporation of a conducting material through a mask. The material from which the electrodes 6, 7, 8 and 9 are formed may or may not be transmitting. For instance it may be aluminium, gold or tin oxide.

The circuit diagram part of FIG. 1 shows how alternating electrical potentials may be applied to the electrodes 6, 7, 8 and 9. An a.c. signal generator 15 is connected across the primary winding 17 of a step-up transformer 18 having an output winding 19. One end 19a of the output winding 10 is connected to a first input terminal of each of a set of four two-way switches 20, 21, 22 and 23 in parallel, whilst the other end 19b of the output winding 19 is connected to a second input terminal of each of the switches 20, 21, 22, and 23 in parallel. The switches 20, 21, 22 and 23 have output terminals which are connected to the electrodes 8, 7, 6 and 9 by conductors 12, 11, 10 and 13 respectively. Although the switches 20, 21, 22, 23 are shown convenionally as manually operated switches they may be electrically operated switches, e.g. transistor switches.

The generator 15 provides an alternating voltage typically of 50 volts (rms) with a frequency of about 800 Hz. This voltage is increased to a few hundred volts by the transformer 18. The electrical potentials at the ends 19a and 19b of the output winding 19 alternate in antiphase with each other at the frequency of this voltage. Each of the switches 20, 21, 22, 23 may be set so that its output terminal is connected to either of its two input terminals, so that each of the electrodes 6, 7, 8 and 9 may be biased with an alternating potential of a few hundred volts either in phase or in antiphase with the potential of the end 19a of the output winding 19 as desired. Thus, the electrodes 6, 7, 8 and 9 may be considered to be biased with either a 'positive' or 'negative' phase.

Figure 2:
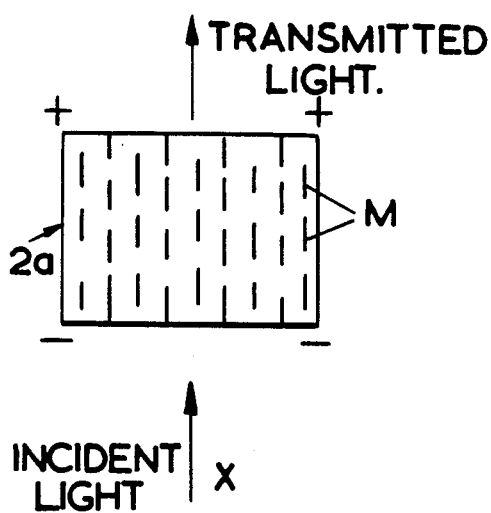
FIGS. 2, 3 and 4 are sketch diagrams of various molecular arrangements which may be obtained in part of cell shown in FIG. 1.

If the electrodes 8 and 9 are both biased with a positive phase and the electrodes 6 and 7 are both biased with negative phase the liquid crystal molecules of the layer 2 all have an alignment which is generally orthogonal to the plane of the slides 3, 4, i.e. along the two parallel electric fields which run respectively between the electrodes 8 and 6 and between the electrodes 9 and 7. FIG. 2 shows how the molecules, denoted by the reference symbol M, are aligned in this way in a zone 2a (FIG. 1) of the layer 2 extending between the edges 6a, 7a, 8a and 9a of the electrodes 6, 7, 8 and 9. The corners of the zone 2a as shown in FIG. 2 are labelled to show the phase of the potentials applied to the respective electrodes 6, 7, 8 and 9. If light is incident on the zone 2a in a direction X (in the plane of the drawing) the light emerges after transmission through the zone 2a undeviated and proceeds along the direction X.

If the phase of the electrode 7 is reversed to become positive but the phases of the other electrodes 6, 8 and 9 are kept the same then the molecules in the layer 2 forms three zones of different orientation as described above. One zone is formed between the electrodes 8 and 6; the second zone is formed between the electrodes 9 and 7; and the third zone is the zone 2a. In the first zone the liquid crystal molecules all lie generally along the electric field between the electrodes 6 and 8, ie orthogonal to the plates 3 and 4. In the second zone the liquid crystal molecules all lie generally along the electric field between the electrodes 6 and 7, i.e. in the plane of the plates 3 and 4 and generally orthogonal to the molecules in the first zone. In the third zone, i.e. the zone 2a, the molecules have an orientation which changes gradually from that of the first zone to that of the second zone.

Figure 3:
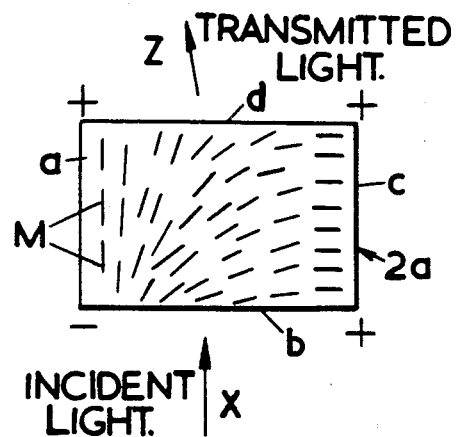

FIG. 3 shows how the molecules, denoted by the reference symbol M, are orientated in this way in the zone 2a. The corners of the zone 2a are labelled with the phases of the respective electrodes at those corners. If light having a plane of polarisation in the plane of the drawing is incident in the direction X on the zone 2a the light emerges after transmission through the zone 2a along a direction Z which is at an angle to X as a result of the refractive index gradient which exists across the zone 2a as a result of the variation in molecular orientation. If the incident light is polarised the emergent light will all be transmitted along the direction Z. However if the incident light is unpolarised only the extraordinary component, i.e. the polarisation component in the plane of the drawing, of the emergent light will be transmitted along the direction Z, although the ordinary component, which proceeds undeviated along the direction X, may be removed by an absorber (not shown) if necessary.

Thus by reversing the phase of the electrode 6 (or any one of the other electrodxs instead) light incident on the cell 1 may be deflected as and when desired.

The arrangement of the molecules M in the zone 2a as shown in FIG. 3 is somewhat simplified for clarity. In fact, the molecules M adjacent to the edge of the zone 2a labelled 'a' in FIG. 3 are not parallel to the edge 'a' and the molecules M adjacent to the edge labelled 'c' are not parallel to the edges labelled 'b' and 'd'. As a consequence, deflection of light is obtained throughout the zone 2a, even near the edges a and c, and the deflection is not always in the same sense as shown in FIG. 3.

Figure 5:
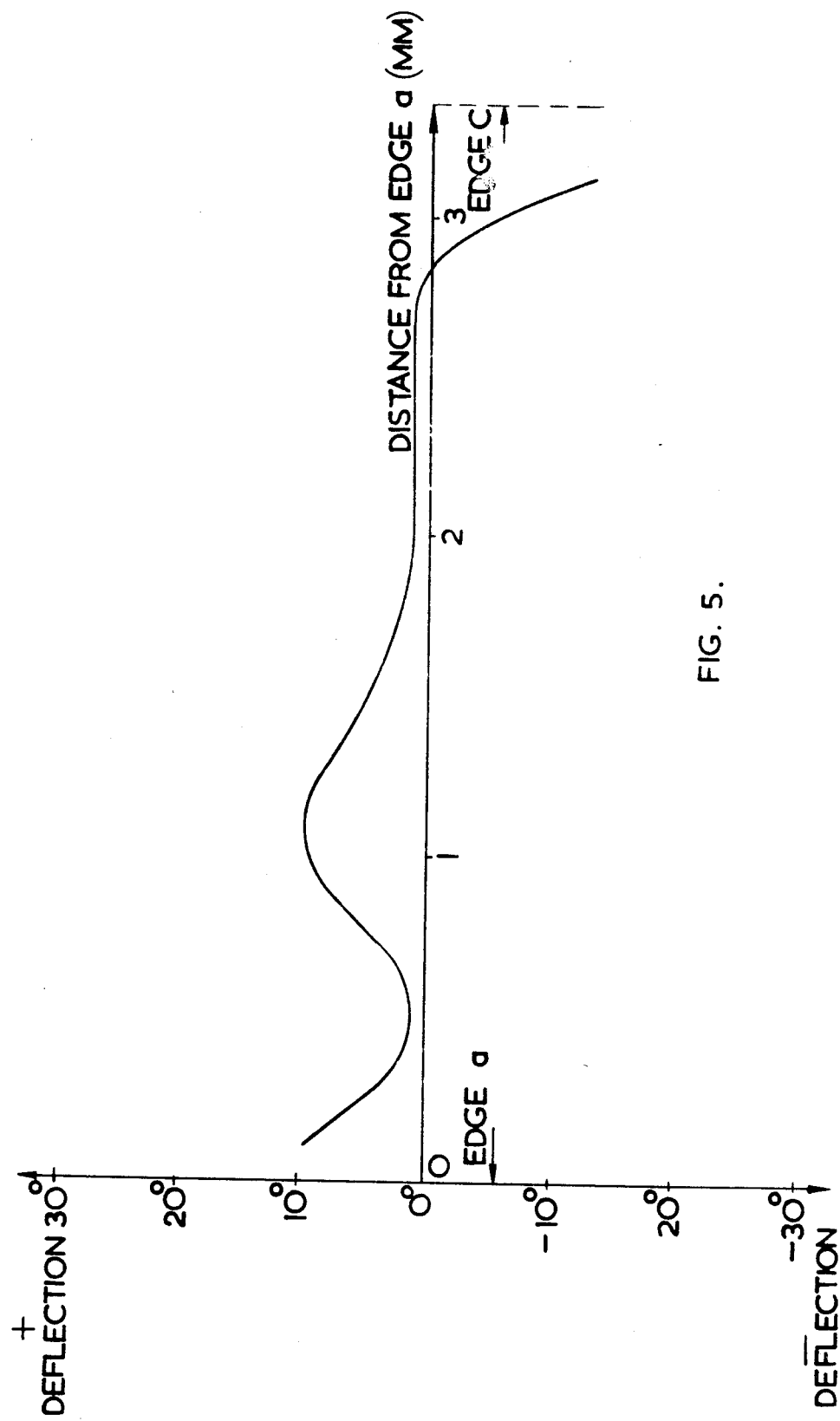
FIG. 5 is a graph of angular deflection of a laser beam plotted against the position of a spot formed by the beam when incident on a selected part of the cell shown in FIG. 1.

FIG. 5 is a graph of the deflection which has been measured for a laser beam incident on the zone 2a plotted against the position of the spot formed by the beam as it was moved across the zone 2a parallel to the edges b and d. For this example the edges a and c were 1.15 mm long, the edges b and d were 3.37 mm long and the refractive index varied by about 0.2 from the edge a to the edge c. The graph shows that the deflection varies continuously as the spot moves across the zone 2a and the deflection changes from a positive to a negative sense near the edge c. Thus the amount and sense of deflection of a laser beam may be chosen by selecting the position of the incident spot formed by the beam on the zone 2a.

Figure 4:
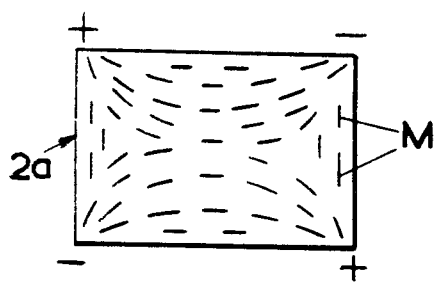

In a further alternative embodiment of the invention two electrodes in the group comprising the electrodes 6, 7, 8 and 9 may be reversed in phase. FIG. 4 shows the orientation of the liquid crystal molecules, denoted by the reference symbol M, in the zone 2a (FIG. 1) when the electrodes 7 and 9 are reversed in phase. The phases of these electrodes and of the electrodes 6 and 8 are indicated at the respective corners of the zone 2a in FIG. 4. The zone 2a provides a molecular arrangement which acts as a lens to incident light.

Although the above embodiments of the invention have been described in terms of the use of a liquid crystal material having a positive dielectric anisotropy a material having a negative dielectric anisotropy, e.g. an unsymmetrical 4-Alkanoyloxy 4'-alkanoyloxy biphenyl or MBBA, may alternatively be used to achieve similar results. However in this alternative case if the electrodes 6, 7, 8 and 9 have phases as shown in FIGS. 2, 3 and 4 the molecules are orthogonal to the individual molecules M shown respectively in FIGS. 2, 3 and 4. Preferably, in the negative dielectric anisotropy case the frequency of the a.c. used is greater than 1KHz to avoid dynamic scattering.

In an alternative embodiment of the invention the switches 20, 21, 22 and 23 (FIG. 1) may be replaced by four switches on the low voltage side of four separate transformers replacing the transformer 18. Although this alternative arrangement requires three additional transformers it allows the switching of lower voltages.

In a further alternative embodiment of the invention infra-red transmitting plates, made for example of barium fluoride, may be used instead of the glass plates 3 and 4. The liquid crystal cell may then be used as a chopper for the infra-red radiation incident on a thermal detector (not shown) such as a pyroelectric vidicon tube. One of the switches 20, 21, 22 and 23 may be continuously reversed, e.g. under the control of a transistor multivibrator, (not shown) for this purpose.

In a further alternative embodiment of the invention the electrodes 6 and 7 may be replaced by a single strip of resistive material such as silicon and the electrodes 8 and 9 may be similarly replaced by such a strip. In this case the various operating potentials are applied to the ends of the strips and the entire liquid crystal layer between the four strips ends acts in the same way as the zone 2a described with reference to FIGS. 1 to 3.

The cell geometry is not limited to that shown in FIG. 1 and in fact may be in any suitable form. More than four electrodes may be used, biased as required, and located in any suitable positions around the cell. An example of using eight electrodes is described below.

The electrodes need not all by biased with the same voltage magnitude: the electric field in the cell may be controlled by applying different voltage magnitudes to different electrodes, e.g. by incorporating adjustable resistors in the contacts to the electrodes and by adjusting the resistors as required.

Figure 6:
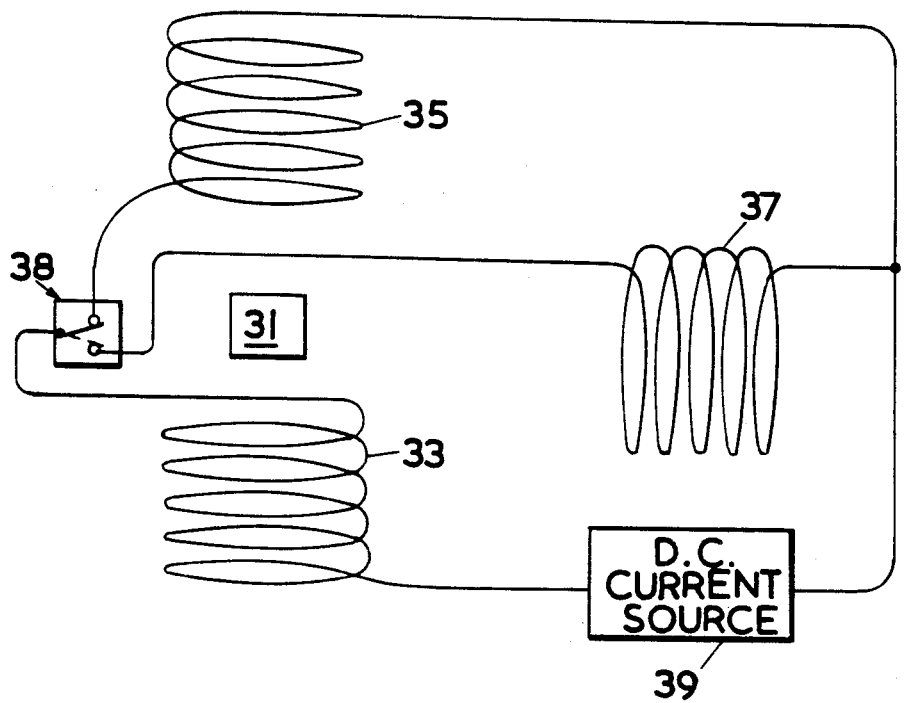
FIG. 6 is a schematic circuit diagram of a magnetic field operated liquid crystal modulation device.

In a further alternative embodiment of the invention the fields which are used to provide refraction of the radiation incident on the liquid crystal cell may be magnetic instead of electric. FIG. 6 shows an example of such an arrangement. A liquid crystal cell 31 is located between the adjacent ends of a coil 33 and a coaxial coil 35 spaced apart from the coil 33, and next to a coil 37 having an axis perpendicular to that of the coils 33 and 35. A d.c. current supply 39 is connected in series with the coil 33 and with a two-way switch 38, and a circuit back to the supply 39 is formed either through the coil 35 or through the coil 37 depending on the position of the switch 38.

The source 39 supplies to the coils sufficient current to provide magnetic fields, typically 2kGauss or more, in the cell 31 which overcome the surface forces of the walls of the cell 31 on the liquid crystal molecules in the cell.

If the coil 35 is supplied with current and not the coil 37 then a uniform magnetic field along the axis of the coils 33, 35 extends through the cell 31.

The cell 31 behaves similarly to the cell 1 as described with reference to FIG. 2 above.

If the coil 37 is alternatively supplied with current then two mutually orthogonal magnetic fields are applied to the cell 31 from the coils 33, 37. The cell 31 behaves similarly to the cell 1 as described above with reference to FIG. 3.

Thus, by selecting the position of the reversing switch 38 light incident on the cell 31 along the axis of the coil 33 in the plane of the drawing may be deflected or not deflected as desired.

An embodiment of the present invention which involves the use of an eight electrode cell will now be described. This embodiment is a modification of the FIG. 1 device, having all the components and features shown in FIG. 1 together with additional components and features as follows.

Figure 7:
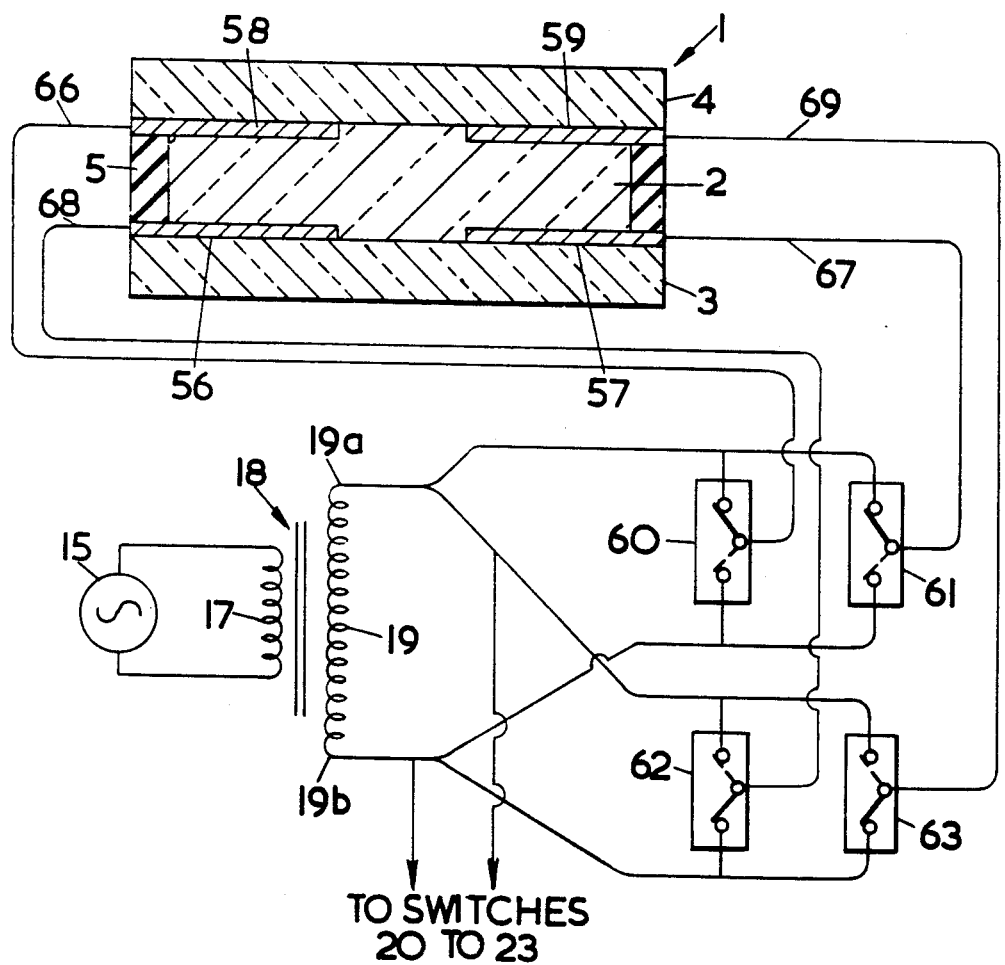
FIG. 7 is another sectional view of the cell shown in FIG. 1 together with an arrangement for applying voltages to the cell.
Figure 8:
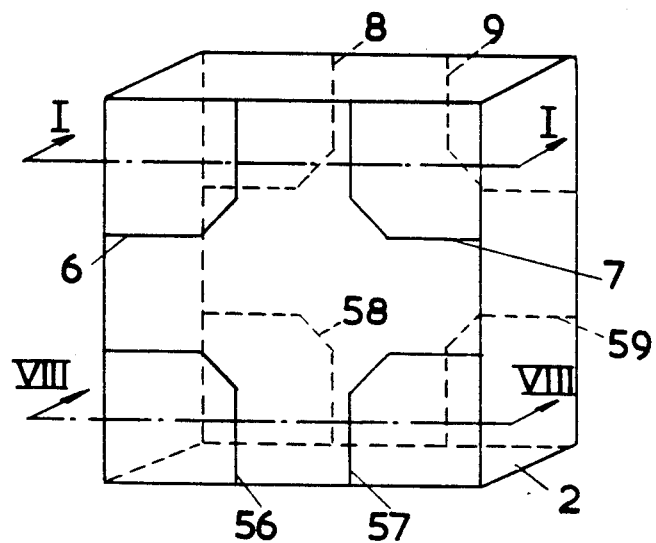
FIG. 8 is a simplified perspective view of the electrode arrangement of the cell shown in FIGS. 1 and 7.

Additional electrodes 56 and 57 are fabricated on the inner surface of the substrate 3 spaced apart from each other and from the electrodes 6 and 7 (FIG. 1) whilst additional electrodes 58 and 59 are fabricated on the inner surface of the substrate 4 spaced apart from each other and from the electrodes 8 and 9 (FIG. 1). FIG. 7 shows the additional electrodes in section whilst FIG. 8 shows the complete electrode arrangement. The substrates 3 and 4, the spacer 5 and the electrode thicknesses are all removed for clarity in FIG. 8. The lines I—I and VII—VII shown in FIG. 8 indicate the relationship between FIGS. 1, 7 and 8: the sectional parts of FIGS. 1 and 7 are respectively views of the planes defined by the lines I—I and VII—VII. Each of the eight electrodes 6 to 9 and 56 to 59 occupies one corner of the rectangular liquid crystal layer 2 and the electrodes together define a central octagonal zone of the layer 2 indicated by the reference numeral 70 in FIG. 9 in which the electrodes are omitted.

Switchable electrical potentials are applied to the electrodes 56, 57, 58 and 59 in a similar manner to that used for the electrodes 6 to 9 (FIG. 1). The end 19a of the output winding 19 of the transformer 18 (FIGS. 1 and 7) is connected in parallel to a first input terminal of each of a set of four additional two-way switches 60, 61, 62 and 63 (FIG. 7) whilst the other end 19b of the output winding is connected to a second input terminal of each of the switches 60, 61, 62 and 63 in parallel. The switches 60, 61, 62 and 63 have output terminals which are connected to the electrodes 58, 57, 56 and 59 by conductors 66, 67, 68 and 69 respectively.

Like the switches 20 to 23, each of the switches 60 to 63 may be set so that its output terminal is connected to either of its two input terminals, so that each of the electrodes 26, 27, 28 and 29 may be biased with an alternating potential of a few hundred volts either in phase or in antiphase with the potential of the end 19a of the output winding 19 as desired. Thus, the electrodes 26, 27, 28 and 29 may be considered to be biased with either a 'positive' or 'negative' phase.

Figure 9:
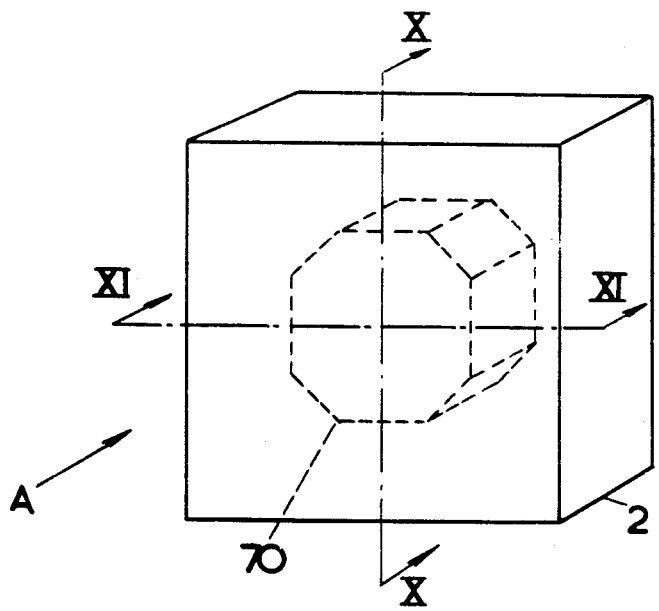
FIG. 9 is a simplified perspective view of the liquid crystal layer shown in FIG. 8.

Operation may be explained by considering the effect of various phase combinations on the molecular arrangements in vertical and horizontal planes through the zone 70 (FIG. 9). Such planes are indicated respectively by the lines X—X and XI—XI and molecular arrangements in them are shown in a simplified way in FIGS. 10 and 11 (vertical planes) and FIGS. 12 and 13 (horizontal planes), the molecules being indicated by a symbol M.

If the four electrodes 6, 7, 8 and 9 at one vertical end of the cell 1 all have a negative phase and the four electrodes 56, 57, 58 and 59 at the opposite vertical end all have a positive phase then the molecules in the zone 70 will be undirectionally aligned vertically as shown in FIGS. 10 and 12 and light incident on the zone 70 in a direction A will be undeflected and emerge in the direction A. However, if the phase of the electrodes 8 and 9 only is now reversed, i.e. made positive, the orientation of the molecules M will gradually change throughout the vertical plane as shown in FIG. 11 giving a refractive index gradient vertically through the zone 70.

The vertical polarisation component of light incident in the direction A is thus deflected along a direction B. A similar effect is obtained by reversing the phase of any one of the other three similar pairs of electrodes which are on the same substrate and at the same vertical end of the cell 1, viz the electrodes 6 and 7, 56 and 57, or 58 and 59.

If the phase of the electrodes 8 and 56 only is now reversed instead the orientation of the molecules M will vary spatially from a horizontal alignment near the electrodes 6, 8, 56 and 58 at one end (considered horizontally) of the zone 70 to a vertical alignment near the electrodes 7, 9, 57 and 59 at the other end. The detailed molecular arrangement depends on the dimensions of the zone 70 and FIG. 13 is merely illustrative of a typical arrangement. However, the common feature of all possible molecular arrangements is a horizontal refractive index gradient for the vertically polarised component of light incident along the direction A which causes the component to be deflected in the horizontal plane along a direction C as shown. A similar effect is obtained by reversing the plane of one of the following pairs of electrodes 6 and 58, 9 and 57; or 7 and 59.

A combination of the vertical and horizontal deflections as illustrated in FIGS. 11 and 13 may be obtained by reversing the phase of three electrodes such as the electrodes 8, 9 and 56.

If light is incident in a rearward direction opposite to the direction A similar vertical and horizontal deflections to those described above may be obtained.

Since only the vertical polarisation component of incident light is deflected in FIGS. 11 and 13 if the incident light is unpolarised its undeflected component will always be horizontal. Thus this undeflected light (not shown in FIGS. 11 and 13) may simply be removed by the insertion of a vertical polariser in its path.

We claim:

1. An optical modulation device comprising:
two spaced transparent dielectric substrates, a layer of nematic liquid crystal material having a positive dielectric anisotropy sandwiched between the substrates, at least two electrodes spaced apart on the inner surface of one substrate and facing these electrodes at least two electrodes spaced apart on the inner surface of the other substrate, means for producing electrical bias fields across the layer of liquid crystal material to produce a first condition in which molecules of the liquid crystal material are aligned by the field in a generally uniform direction and to produce separately a second condition in which the molecules of the liquid crystal material are oriented by the bias fields to provide a controlled refractive index gradient across the layer of liquid crystal material capable of refracting optical radiation having a plane of the gradient, the amount of the refraction being controlled by the bias fields, and means for changing the bias fields between the first and second conditions.

2. A device as claimed in claim 1 and wherein said electrodes comprise on one of said inner surfaces four electrodes arranged in a ring formation and, facing said four electrodes, four further electrodes on the other of said substrate inner surfaces, each of a plurality of said electrodes being connected to an electrical switch capable of switching the polarity of that electrode.

3. A device as claimed in claim 2 and including a voltage transformer having an output winding, each of said switches having two alternative input connections, one connection being to one end of said output winding and the other connection being to the other end of said output winding.

4. A device as claimed in claim 1 and including a voltage transformer having an output winding, and a switch having two alternative input connections, one connection being to one end of said output winding and the other connection being to the opposite end of said output winding.

5. A device as claimed in claim 1 and wherein said liquid crystal material is a 4'-alkyl- or -alkoxy-4-cyanobiphenyl.

6. A device as claimed in claim 5 and wherein said liquid crystal material comprises a mixture of 4'-alkyl or -alkoxy-4-cyanobiphenyls and a cyanoterphenyl.

* * * * *